INVENTOR
Lynn S. Burgett
BY
Warren H. F. Schmieding
ATTORNEY

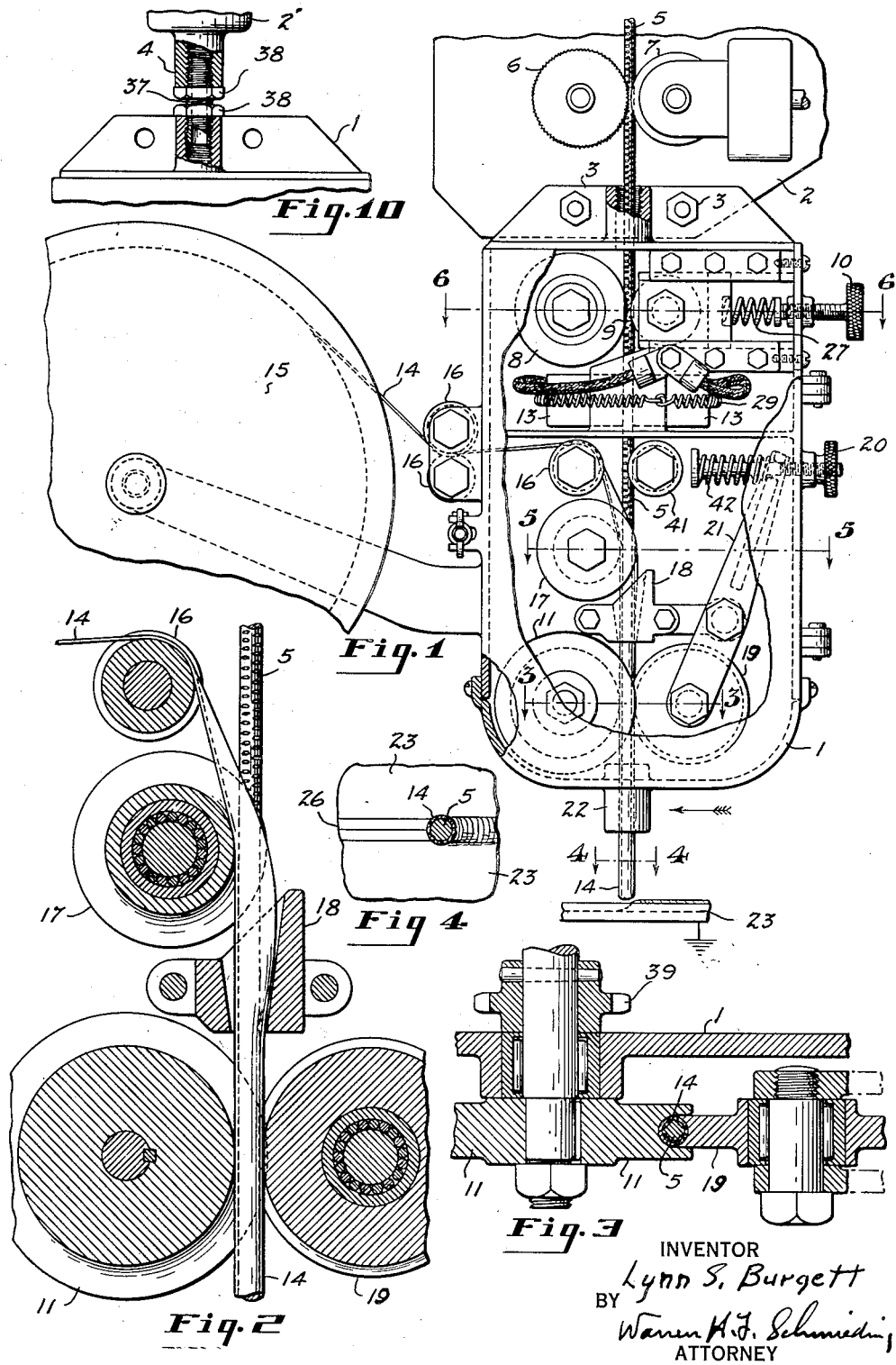

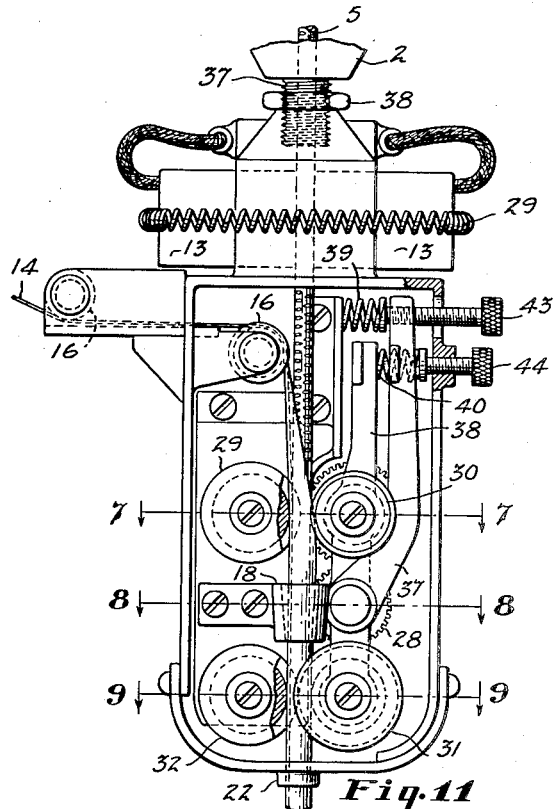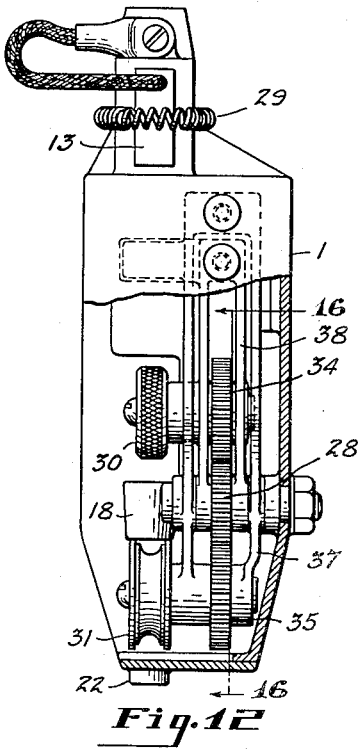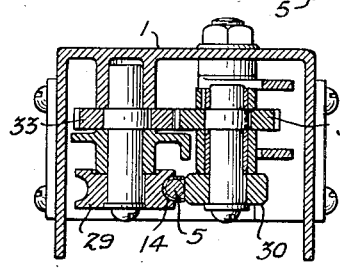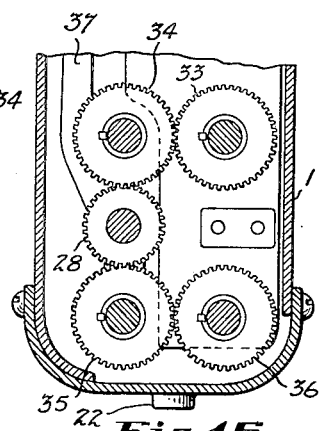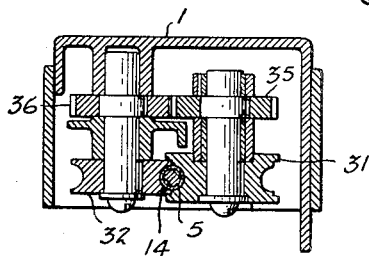

Patented July 13, 1937

2,087,057

UNITED STATES PATENT OFFICE 2,087,057

WELDING APPARATUS

Lynn S. Burgett, Euclid, Ohio, assignor to Una Welding, Inc., East Cleveland, Ohio, a corporation of Delaware Application March 31, 1936, Serial No. 71,978

7 Claims. (Cl. 219—8)

My invention relates to automatic welding or cutting equipment and particularly to a welding or cutting head which incorporates means for automatically feeding the wire to the work and simultaneously feeding tape of a suitable character to be associated with the wire.

One of the objects of my invention is to provide a welding or cutting head capable of automatically feeding wire to the work at any desired speed and simultaneously and synchronously feeding tape of a suitable character that is to be mechanically associated with the wire.

Another object is to provide a feeding mechanism for the tape that is directly controlled by the feeding mechanism for the wire.

A further object is to provide a positive method of mechanically associating the tape material to the wire so that it will be in the proper position when the wire advances to the work to be welded or cut.

Other objects will be apparent through the disclosures and drawings contained herein.

Fig. 1 is a front elevation of the preferred form of welding or cutting head;

Fig. 2 is an enlarged sectional view of the tape feeding rollers and the tape forming chute arrangement;

Fig. 3 is a sectional view through the line 3—3 of Fig. 1 showing the peculiar engagement of the tape forming and feeding rolls;

Fig. 4 is a sectional view through line 4—4 of Fig. 1 and also shows the position of the work to be welded or cut in relationship to the wire;

Fig. 7 is a sectional view through Fig. 11 at the line 7—7;

Fig. 8 is a sectional view through Fig. 11 at the line 8—8;

Fig. 9 is a sectional view through Fig. 11 at the line 9—9;

Fig. 10 is an enlarged front view of an optional construction for attaching the welding or cutting head to the machine;

Fig. 11 is a front elevational view of an optional construction for the welding or cutting head;

Fig. 12 is a side elevational view of Fig. 11;

Fig. 16 is a section through Fig. 12 on the line 16—16 showing the gear drive.

Figure 13:
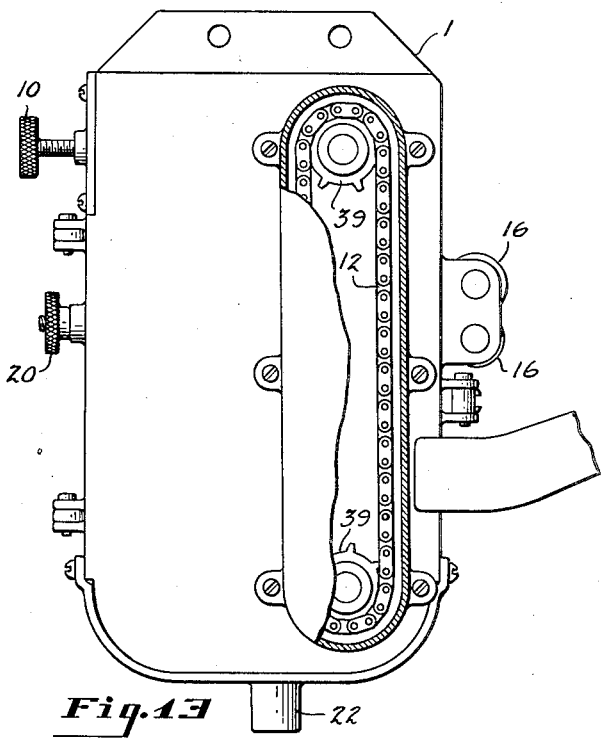
Fig. 13 is a rear view of Fig. 1 showing the chain drive mechanism.
Figure 14:
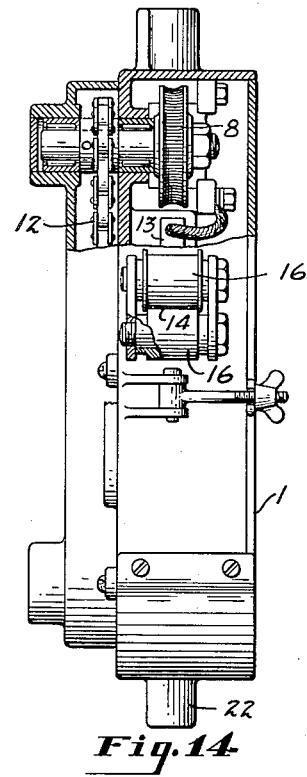
Fig. 14 is a side elevation of Fig. 1 showing further details of construction.

Referring to Fig. 1, numeral 1 represents the main body of the preferred form of welding or cutting head which is attached to the wire feeding mechanism 2. These two parts are associated by the bolts 3 or by the optional connecting structure 4 shown in Fig. 10. In this construction a stud 37 is screwed into both parts and is prevented from turning or loosening by lock nuts 38. Wire 5 is fed to the head by a frictionally engaging knurled wheel or roll 6 which is held in wire driving relationship with the wire by the roller 7. The tape feed controlling roller 8 having a U-shaped groove for contact to the wire 5 is also frictionally engaged to the wire by the pressure of roll 9 which is adjustably mounted with spring tension which may be varied by the knurled thumb-screw 10. The principle of operation may be explained as follows: as the wire is fed toward the work by roll 6, roll 8 is revolved at a rate of speed to correspond to the movement of the wire. This roll, 8 is engaged, by a chain 12 and sprockets 39 shown in Fig. 13, with the tape feeding roll 11. While the construction cited is preferred because of ease of removability of the head, it is entirely within the scope of this invention to directly connect the roll 6 with the roll 11 and eliminate the intermediate roll 8

The wire 5 as shown in the drawings, is of the dented type. It is evident however that the disclosed welding or cutting head would operate equally as well with any other type of wire.

Figure 5:
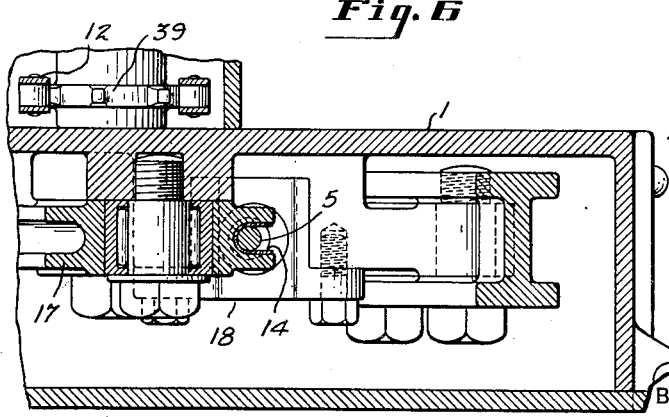
Fig. 5 is a sectional view through the line 5—5 of Fig. 1 and shows the relationship of the forming roll to the wire.

Current is fed to the wire 5 through brushes 13 which are held in close wiping connection with the wire 5 by the encircling spring 29 which supplies tension at all times. The work 23 is grounded and forms the other pole for the electrical connection. The tape 14 is made of any suitable material such as paper, fabric, asbestos, woven wire, or any other material that will be advantageous in this particular use and this tape may be coated or impregnated with various chemicals, fluxing materials, etc., as may be found desirable. The tape 14 is held in a coil on the reel 15 and is fed through idling guide rollers 16 to the forming roller 17. This grooved roll 17 cooperates with the wire 5 and forms the tape into a U-shape as shown in Fig. 5 at 14. The tape 14 therefore partially surrounds the wire 5 as they pass through the chute 18. The chute 18 has a tapered bore which assists in forming the tape circularly. An enlarged view of this part of the mechanism is shown in Fig. 2 and gives a clear conception as to the method of forming the tape around the wire and of the chute 18 which aids in closer associating the tape to the wire. Preferably, the forming roll 17 is disposed so that it is frictionally driven by the movement of the tape. The wire 5 is held in alignment by the contacting idling roll 41.

The tape 14 after passing through the chute 18 is encircled, preferably completely, about the wire 5 by the final tape feeding and chain driven forming roller 11 cooperating with roller 19. The wire is held in intimate frictional relationship with the roll 11 by the roller 19 by the spring tension of a spring 42 which is easily adjusted by the thumb-screw 20 through the lever arrangement 21.

Fig. 3 shows an enlarged section through this latter pair of rolls. It will be noted that the rolls are grooved and so interlocked as to preferably completely wrap the tape 14 about the wire 5. Due to the frictional pressure exerted between these last two rolls, the tape is closely associated to the wire as it passes through the nozzle 22 to the work 23.

Figure 15:
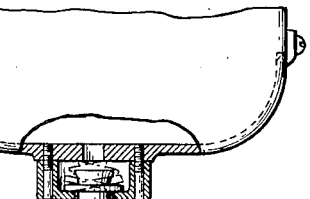
Fig. 15 is an optional arrangement for the nozzle of the welding head.

A variation of this nozzle construction is shown in Fig. 15. Here the extension piece 24 is loosely engaged in the bearing 25. This construction allows considerable movement of the outer end of the nozzle. The particular construction disclosed is especially useful when it becomes necessary to swing the wire away from the perpendicular for any given reason. This sleeve or extension aids in holding the tape to the wire 5.

Fig. 4 shows the relationship of the tape covered wire as it passes to the work 23. The edges of the pieces 23 to be welded are beveled in the preferred form so that when they are brought in contact they form a V-slot 26 at the point to be welded. This V-slot or trough forms an excellent joint as it allows for an even, smooth weld.

It is to be understood that the foregoing reference to welding in no way limits my invention, but is merely one way that the invention may be used advantageously. As previously pointed out, the automatic head described is equally well adapted to perform cutting operations.

In Fig. 13 sprockets 39 and chain 12 drive between the tape feeding roll 11 and the wire governing roll 8 is shown in section.

Figure 6:
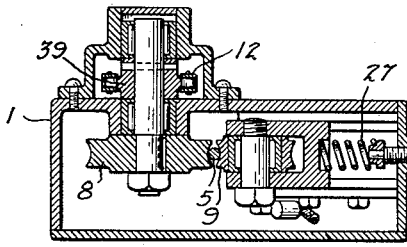
Fig. 6 is a sectional view through 6—6 of Fig. 1.

Reference to Fig. 6 gives a clear illustration of the method by which the governing roll 8 is held in frictional relationship with the wire 5. The roll 9 is tightly pressed against the wire 5 by the compression exerted by the spring 27 which is adjustable by the screw 10. As the wire 5 is advanced or retracted, the roll 8 is revolved at the same speed and in the same direction due to its positive chain engagement with the tape feeding roll 11. To take care of retraction of the wire, any suitable retracting means can be provided for the reel 15; this means not only takes up the slack, but during normal advancing operation supplies a slight drag that keeps the tape taut so that it does not tangle.

Fig. 5 illustrates forming means employed by the grooved roller 17 to shape up the tape into a U-form and partially encircle it about the wire.

Fig. 11 shows another embodiment of the head. In this construction, the wire is fed in a similar manner as before. Roll 29 is the tape forming roll and is held in tight contact with the wire 5 by the knurled compression roller 30. This is better illustrated in the section shown in Fig. 7. The tape is again in a U-shape and partially encircles the wire. It then goes through the chute 18 and on to the tape feeding rolls 31 and 32. These last two rolls again, are used to shape the tape around the wire as shown in Fig. 9.

From Fig. 16 it will be noted that the roller and gears are associated as follows: roller 29 with gear 33, roll 30 with gear 34, roll 32 with gear 36 and roll 31 with gear 35. In other words, each roll is connected by associated gearing. As rolls 29 and 30 are revolved by the movement of the wire in either direction, they actuate the tape feeding roll 31 through the gear engagement as transmitted by gear 28. The rolls and gears 30, 31 and 34, 28 and 35 are all mounted on pivotable bearings 37, 38 which are free to move inwardly and thus take up any play between the rolls. These mountings, 37, 38 are constantly compressing the rolls to keep them in the proper position. This compression is supplied by the adjustable springs at 39 and 40 which may be varied by cooperating thumb screws 43 and 44.

This type of construction accomplishes the same results as the head in Fig. 1 since it assures that the tape will be fed at the same speed as the wire. Variations within the scope of this last type of construction are obvious and include frictionally engaged rolls, rather than the geared construction. It is also possible to use complete gearing through to the wire driving wheel 6 as shown in Fig. 1.

From the foregoing disclosure it is evident that my invention has definite advantages in the welding and cutting art. I have provided for synchronously feeding wire and tape, thus assuring proper feeding of flux or other ingredients for welding or cutting.

While the forms of embodiment of the present invention as herein disclosed constitute preferred forms, it is to be understood that other forms might be adopted, all coming within the scope of the claims which follow:

I claim:

1. In combination with a welding wire and tape, a machine for feeding wire and tape to the work including means for feeding wire, a roller for impinging the tape against the wire, and means engaging the wire directly and moved by the movement of the wire for actuating said roller.

2. In combination with a welding wire and tape, a machine for feeding wire and tape to the work including means for feeding wire, means for feeding tape concomitantly with the wire including cooperating elements for impinging the tape against the wire and shaping the tape, one of said elements forming a driving element for the tape, and means engaging the wire directly and moved by the movement of the wire for actuating the driving element.

3. In combination with a welding wire and tape, a machine for feeding wire and tape to the work including means for feeding wire, means for feeding tape concomitantly with the wire including cooperating elements for impinging the tape against the wire and shaping the tape, one of said elements being a roller for moving the tape, and means engaging the wire directly and moved by the movement of the wire for actuating said roller.

4. In combination with a welding wire and tape, a machine for feeding wire and tape to the work including means for feeding wire, means for partly shaping the tape about the wire, means for feeding tape concomitantly with the wire including cooperating elements for impinging the tape against the wire and for further shaping the tape about the wire, one of said elements forming a driving element for the tape, and means engaging the wire directly and moved by the movement of the wire for actuating the driving element.

5. In combination with a welding wire and tape, a machine for feeding wire and tape to the work including means for feeding wire, a grooved roller impinging the tape against the wire for partly shaping the tape about the wire, means for feeding tape concomitantly with the wire including cooperating elements for impinging the tape against the wire and for further shaping the tape about the wire, one of said elements forming a driving element for the tape, and means engaging the wire directly and moved by the movement of the wire for actuating the driving element.

6. In combination with a welding wire and tape, a machine for feeding wire and tape to the work including means for feeding wire, grooved means impinging the tape against one side of the wire for partly shaping the tape about the wire, a roller disposed in frictional engagement with the wire and driven thereby, means for feeding tape concomitantly with the wire including cooperating elements for impinging the tape against the wire and shaping the tape, one of said elements forming a driving element for the tape, said driving element being connected with said roller and driven thereby.

7. In combination with a welding wire and tape, a machine for feeding wire and tape to the work, including means for feeding wire, a roller for impinging the tape against the wire, and means for actuating said roller, said last means being directly controlled by the wire feeding means.

LYNN S. BURGETT.